(12) United States Patent
Marczynski

(10) Patent No.: US 9,353,776 B2
(45) Date of Patent: May 31, 2016

(54) ROTATION INDICATOR

(75) Inventor: Michael Marczynski, Kirkby Lonsdale (GB)

(73) Assignee: BUSINESS LINES LIMITED, Carnforth, Cumbria (GB)

( * ) Notice: Subject to any disclaimer, the term of this patent is extended or adjusted under 35 U.S.C. 154(b) by 346 days.

(21) Appl. No.: 14/239,157

(22) PCT Filed: Aug. 17, 2012

(86) PCT No.: PCT/GB2012/052013
§ 371 (c)(1),
(2), (4) Date: Feb. 17, 2014

(87) PCT Pub. No.: WO2013/024302
PCT Pub. Date: Feb. 21, 2013

(65) Prior Publication Data
US 2014/0196657 A1    Jul. 17, 2014

(30) Foreign Application Priority Data
Aug. 17, 2011   (GB) .................................. 1114145.4

(51) Int. Cl.
*F16B 37/14*   (2006.01)
*F16B 1/00*   (2006.01)

(52) U.S. Cl.
CPC ................ *F16B 1/0071* (2013.01); *F16B 37/14* (2013.01)

(58) Field of Classification Search
CPC .................................................... F16B 1/0071
USPC ........................................................ 116/328
See application file for complete search history.

(56) References Cited

U.S. PATENT DOCUMENTS 5,120,174 A * 6/1992 Patti ...................... F16B 1/0071
   116/28 R
6,270,302 B1 * 8/2001 Lyons ....................... B60B 3/16
   411/121

(Continued)

FOREIGN PATENT DOCUMENTS

CA   2328814 A1 *  6/2002  .......... E05D 13/1269
EP   2642135 A1 *  9/2013  ............ F16B 1/0071

(Continued)

OTHER PUBLICATIONS

United Kingdom Search Report issued on Nov. 22, 2011, corresponding to UK Application No. GB1114145.4.

(Continued)

*Primary Examiner* — Daniel S Larkin
*Assistant Examiner* — Irving A Campbell
(74) *Attorney, Agent, or Firm* — Ladas & Parry LLP

(57) ABSTRACT

For mounting on a wheel nut or similar a rotation indicator device includes a body of one piece construction having an annular portion to releasably fit in non-rotatable manner onto the nut and having an end wall portion provided with an indicator. The indicator is provided within the periphery of the device, at a position which, in use, overlies the nut to which it is fitted, by having at least one opening in the end wall portion with free edges configured as the indicator (e.g. pointer with tip). The one piece device may also include side walling of part annular configuration extending between the annular portion and the end wall portion with the free edges being where the side walling is not connected to the end portion. A support post may then extend between the annular portion and the end wall portion at a location remote from the side walling.

12 Claims, 2 Drawing Sheets

(56) References Cited

U.S. PATENT DOCUMENTS

| | | | |
|---|---|---|---|
| 6,561,124 B1 * | 5/2003 | Marczynski | F16B 1/0071 116/306 |
| 2007/0180937 A1 | 8/2007 | Thomson et al. | |

FOREIGN PATENT DOCUMENTS

| | | | |
|---|---|---|---|
| FR | 2938615 A1 * | 5/2010 | F16B 1/0071 |
| GB | 2242720 A | 10/1991 | |
| GB | 2325502 A | 11/1998 | |
| GB | 2335720 A | 9/1999 | |
| GB | 2393488 A | 3/2004 | |
| GB | 2409888 A | 7/2005 | |
| GB | 2454164 A | 5/2009 | |

OTHER PUBLICATIONS

International Search Report mailed on Nov. 28, 2012, corresponding to International Application No. PCT/GB2012/052013.

* cited by examiner

ROTATION INDICATOR

This application is a 371 of PCT/GB2012/052013, filed on Aug. 17, 2012, which claims priority to United Kingdom Application No. 1114145.4, filed on Aug. 17, 2011.

The present invention relates to a device for indicating relative rotational displacement between a first member and a second member which are relatively rotatably engaged with each other. The first member is typically a nut and the second member a bolt or a stud onto which the nut is threadedly engaged. The device is of a type which comprises a body having an annular portion adapted to enable the device to be releasably fitted in non-rotatable manner onto a nut or onto a head of a bolt, either of which, as is conventional, has a polygonal peripheral shape.

The applicant's own earlier GB 2242720A discloses a rotation indicator device for a wheel nut, the device comprising a simple annular body having an integral outwardly projecting pointer. The body has a bore formed with a plurality of grooves so that it can be releasably yet non-rotatably mounted onto the wheel nut. The applicant's further specifications GB 2335720A and GB 2325502A disclose developments wherein the annular body is closed at one end, either integrally or by a separable cap, so that the device additionally serves as a dust cap as well as rotation indicator.

Such rotation indicator devices, made of plastics material and each having a radially projecting pointer, are now widely used on heavy goods vehicles as a safety measure to indicate any loosening of the wheel nuts. In this respect the devices are commonly mounted, after initial tightening or torque checking of the nuts, so that the respective pointers are directed circumferentially in the same direction around the circular array of nuts, or so that on adjacent pairs of nuts the pointers are directed towards each other with closely set tips. Other arrangements are possible. The only requirement is that it should be possible to note on quick visual inspection whether any of the pointers is no longer in the initial arrangement, indicating that the relevant nut on which it is mounted has loosened and requires re-torquing. The devices are also brightly coloured or fluorescent to assist in this purpose.

U.S. Pat. No. 5,120,174 discloses a different structure of wheel nut rotation indicator device wherein a dome-like shell is a tight friction fit over a wheel nut and the end of the shell carries a rotatable insert provided with an indicator, such as an arrow.

Certain vehicles, such as excavators, have wheels where the wheel nuts are very closely spaced so there may be insufficient room to accommodate the radially projecting pointers of the applicant's known, commercially available, rotation indicator devices described above.

In some vehicles the wheel nuts are located in recesses or at least partially below a cover plate so that there is restricted space in which such radially projecting pointers can move or such pointers are not easily visible.

Vehicles such as excavators are typically used in difficult terrain, including in mines, where wheel nuts are particularly likely to work loose, and frequently do so. Such vehicles often have in the region of fifty or more wheel nuts per wheel so it can be very time consuming and quite difficult to ensure these are properly and regularly inspected to ascertain which of them are working loose. Sometimes they have to be checked three or four times per day.

An object of the present invention is to provide a modified design of rotation indicator device suitable for use on the wheels of such vehicles, namely where there is restricted room between or adjacent the individual wheel nuts. Such a modified design may, however, also be suitable for use in other circumstances, for example on the nuts or bolts of fixed plant and machinery which is subject to heat and/or vibration potentially causing such nuts or bolts to loosen.

According to the present invention a rotator indicator device is provided comprising a body having an annular portion adapted to enable the device to be releasably fitted in non-rotatable manner onto a nut or onto a head of a bolt and having an end wall portion provided with an indicator, the body being of one piece construction with at least one opening in the end wall portion whereby said end wall portion is configured to provide the indicator at a position which, in use, overlies the nut or the bolt to which it is fitted.

Thus, compared to the applicant's prior devices, the present device is still of one piece construction, which is most suitable for manufacture and use. However, instead of having a radially extending pointer, extending outwards from the annular body, the device of the present invention has the indicator provided within the annular periphery of the device by forming said indicator from an end wall portion of the device which overlies the top of the nut or bolt head when it is positioned thereon.

Just as previously, but notwithstanding restricted space adjacent the nuts (or bolts), any movement signifying loosening of a nut (or bolt), from an initial alignment relative to other nuts (or bolts), can be easily observed upon inspection, and remedial action can be taken.

It is not merely a matter of depicting an indicator on an end wall of the device, as by printing an arrow thereon or by embossing or integrally moulding such an indication as a raised or recessed area. The end wall portion of the device of the invention is configured to provide the indicator by provision of a suitable opening or more than one opening in the end wall portion. This provides an indicator which is not liable to be obscured by dirt and grease or removed by abrasion over time.

In preferred embodiments the device has side walling of part annular configuration extending between the annular portion and the end wall portion. Accordingly, there is a part of the periphery of the end wall portion which has a free edge. In other words, it is not connected to the side walling. A particularly favourable construction of the device has the free edge configured to provide the indicator. Thus, the opening in the end wall portion is continuous with the cut away portion of the side walling.

In a further development, some embodiments of a rotation indicator device in accordance with the invention have the end wall portion provided with a tab, namely a defined section of end wall material which can be lifted. This is to facilitate removal of the device for maintenance purposes and particularly when re-tightening of the underlying nut (or bolt) is required, given that access to such nuts (or bolts) and the indicator devices fitted thereon may be quite narrow, making removal difficult by gripping or leverage from the side or from below the edge of the annular body.

Such a tab is conveniently in the form of a resiliently connected flap which will revert to its initial position when it is no longer being lifted and the device is pushed back onto the nut (or bolt). The tab may be connected to the remainder of the end wall by a region, e.g. a strip, of end wall material of reduced thickness which provides a suitable hinge like connection.

The invention will be described further, by way of example, by reference to the accompanying drawings, in which.

Figure 1:
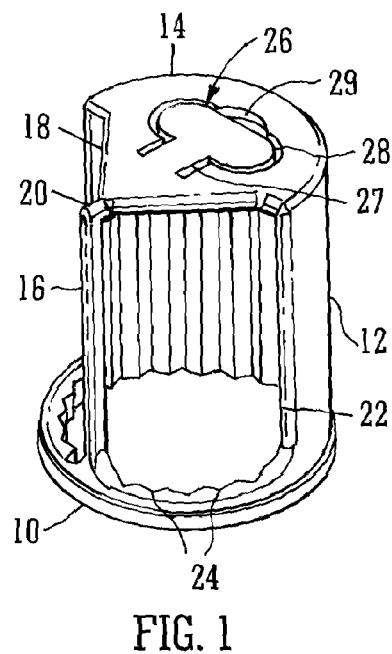
FIG. 1 is a perspective view of a preferred practical embodiment of a wheel nut rotation indicator device in accordance with the present invention.
Figure 2:
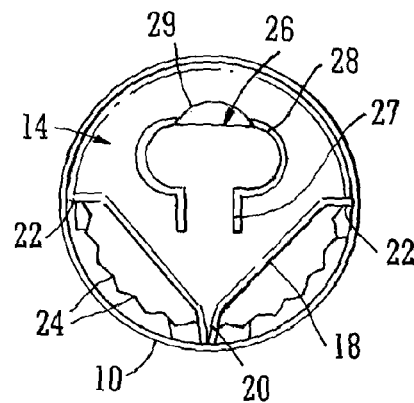
FIG. 2 is an enlarged scale plan view of the device of FIG. 1.
Figure 3:
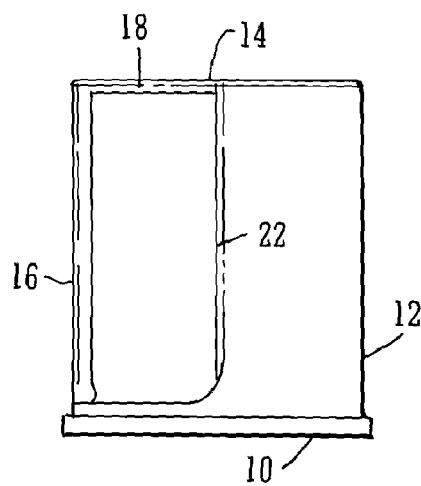
FIG. 3 is an enlarged scale side view of the device of FIG. 1.

The illustrated embodiment of rotation indicator device is moulded in one piece of plastics material. Suitable plastics are polypropylene or polyethylene, but other materials could readily be used. The plastics material preferably incorporates brightly coloured pigment, and a fluorescent pigment is particularly preferred for ease of visibility in use. The device could be made luminous and/or coloured and/or fluorescent in any known manner.

As shown, the one piece body of the device comprises an annular base portion 10, part annular side walling 12 extending from the base portion 10 and an end wall portion 14 which is joined to the base portion by the side walling 12 and by an additional support post 16.

The end wall portion 14 has obliquely formed free edges 18 defining the shape of a pointer with a narrow tip 20 formed where these edges meet. The tip 20 is midway between side edges 22 of the side walling 12. The support post 16 extends between the annular portion 10 and the tip 20, therefore also midway between the side edges 22 of the side walling 12. The support post 16 serves as support for the end wall portion 14 at the tip 20 and enhances the rigidity of the device. The post 16 in this version is aligned axially of the device, namely parallel to a central axis of the annular base portion 10, the external contour of which is circular.

The annular portion 10 has spaced internal grooves 24 to enable fitting onto the polygonal contour of a wheel nut in any selected one of a plurality of positions in a manner which is non-rotatable. In other words the device will fit so as to rotate in unison with the nut. However, provision of these spaced grooves 24 allows the device to be released from the wheel nut by lifting upwards from the nut and the internal dimensions of the annular portion 10 are chosen for close fitting onto a specified size of wheel nut, yet still permitting such release. In the illustrated version there are twenty four equispaced V-shaped grooves 24. Other embodiments have different diameters and different numbers and sizes of such grooves 24, matched to different sizes and types of wheel nut.

In the illustrated version the side walling 12 extends half way around the circumference of the annular portion 10. The grooves 24 continue axially along the internal surface of the side walling so in this case there are twelve grooves 24 extending along the side walling 12 to the junction with the end wall portion 14.

The end wall portion 14 is provided with a tab 26 which is generally T-shaped, having a stalk 27 and an enlarged head 28. On production of the indicator device the shape of the tab 26 may be defined as a groove in the top of the end wall portion 14, leaving a thin membrane of material which breaks the first time the tab 26 is lifted. The tab 26 remains connected at the base of the stalk 27 and hinges at this location when the head 28 is prised upwards. The plastics material may be slightly reduced in thickness at the base of the stalk 27 to provide this hinge connection. A small opening 29 is formed adjacent the head 28 to facilitate lifting of the tab 26. The tab 26 may be lifted and gripped manually or otherwise to enable release of the device from a wheel nut, for example when the wheel nut needs to be re-tightened.

Figure 4:
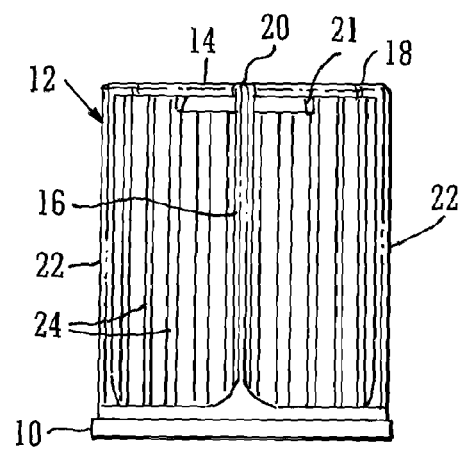
FIG. 4 is an enlarged front view of the device of FIG. 1.

One or more ribs or other formations may be provided across the surface of the tab 26 as an aid to facilitate gripping of the tab when it is used to pull the device upwards off the nut to which it has been fitted. In the illustrated embodiment, parallel ribs 21 are provided, moulded on the under surface of the tab 26, as indicated in FIG. 4.

When the device is placed back on to the wheel nut the tab 26 returns to its initial position by the resilience of the hinge connection and it may be pressed back.

Figure 5A:
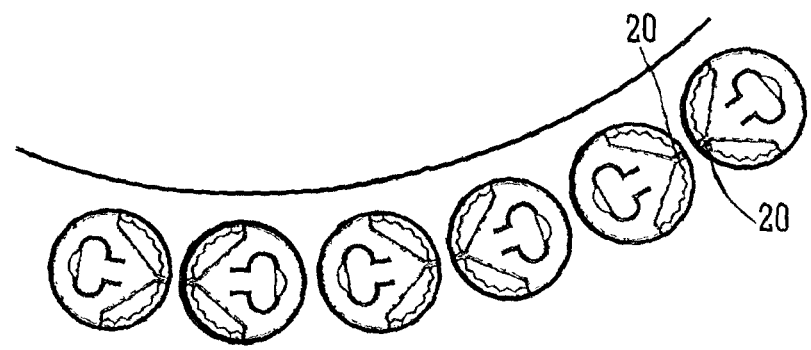
FIGS. 5A and 5B are plan views showing a plurality of rotation indicator devices as in FIGS. 1 to 4 when in use installed in position on plural wheel nuts of a vehicle wheel.
Figure 5B:
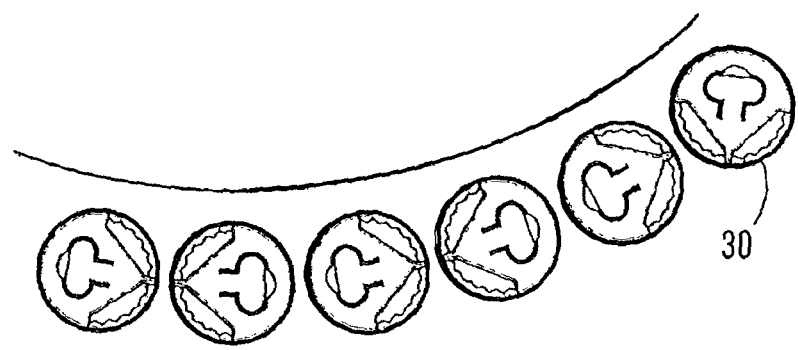

Use of the device is apparent from FIG. 5 and the earlier description of known devices. Respective devices are fitted onto wheel nuts with the pointers provided by the end wall portion 14 in a predetermined arrangement. In the illustrated arrangement of FIG. 5A devices are mounted on adjacent nuts (which have been appropriately tightened) so as to have the tips 20 of their pointers directed towards each other. Obviously only a few of the mounted indicator devices are shown here, whereas in practice they would be mounted in similar fashion on all the nuts of a wheel. Upon later visual inspection it will be noted when a pointer has moved, as shown at 30 in FIG. 5B, by way of illustration. This indicates the wheel nut has loosened and needs to be re-tightened. To enable this to be done the relevant device is removed, for example by use of the tab 26 as already explained.

The provision of the support post 16 may reduce any turning moment at the opposing locations where the unconnected region of the annular portion 10 joins the region which is connected to the side walling 12 when the device is being lifted off a wheel nut. It also reduces any risk of a part of the end wall portion 14 breaking off near the tip 20 and, as mentioned, results in a more robust device than otherwise.

The foregoing is illustrative and not limitative of the scope of the invention. Many variations in detail are possible in other embodiments within the scope of the appended claims. In particular in other embodiments the side walling may be greater or lesser in extent, axially or annularly, and could extend fully around the device, in which case one or more openings, to form an indicator shape from an edge of the end portion, would be provided only in the end wall portion thereof. It is also possible, in other embodiments, that instead of spaced internal grooves on the annular portion to enable the indicator device to be non-rotatably and releasably fitted onto a wheel nut, at least an inner region of the annular portion may be formed of a resilient material of suitable grip and flexibility such as silicone rubber, which will allow such non-rotatable, releasable mounting, as disclosed in the applicant's earlier GB2454164A. The provision of a tab in the end wall, while preferred, is not essential and obviously this may differ in shape and its manner of formation compared to the illustrated version.

While the specific embodiment of rotation indicator device is illustrated and described in relation to mounting on wheel nuts of a vehicle, it must be understood that the device is not limited to that application and the same embodiment or any other embodiments within the scope of the invention may also be used as rotation indicators in respect of any other relatively rotatable members, such as nuts and bolts, which may be used as fasteners in any other article or equipment.

The invention claimed is:

1. A rotation indicator device comprising:
    an annular portion;
    an end wall portion; and
    a side wall of part-annular configuration extending between part of said annular portion and said end wall portion;
    wherein said end wall portion has a free edge where said end wall portion is not connected to said side wall; and
    wherein said free edge defines an indicator.

2. A device according to claim 1 wherein the free edge comprises converging oblique portions.

3. A device according to claim 2, further comprising:
a support post extending between the annular portion and the end wall portion at a location remote from the side wall.

4. A device according to claim 3,
wherein ends of each of the converging oblique portions define a tip; and
wherein the support post is located to support the tip.

5. A device according to claim 1, wherein the side wall extends substantially halfway around the annular portion.

6. A device according to claim 1,
wherein a liftable tab is integrally formed in the end wall portion.

7. A device according to claim 6, wherein the tab is hingedly connected to the end wall portion.

8. A device according to claim 1, wherein the annular portion comprises spaced internal grooves.

9. A device according to claim 8, wherein said internal grooves enable the device to be fitted in a non-rotatable manner onto a nut or onto the head of a bolt in any one of a plurality of selected positions.

10. A device according to claim 1, wherein the device is of one piece construction.

11. A device according to claim 1, wherein said annular portion is configured to enable the device to be releasably fitted in a non-rotatable manner onto a nut or onto a head of a bolt.

12. A device according to claim 11, wherein, in use, said indicator is at a position overlying the nut or head of the bolt.

* * * * *